(12) United States Patent
Valad

(10) Patent No.: US 6,727,921 B1
(45) Date of Patent: Apr. 27, 2004

(54) MIXED MODE INPUT FOR A GRAPHICAL USER INTERFACE (GUI) OF A DATA PROCESSING SYSTEM

(75) Inventor: Farzad Mirshah Valad, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/531,846

(22) Filed: Mar. 20, 2000

(51) Int. Cl.$^7$ .................................................. G09G 5/00
(52) U.S. Cl. ........................ 345/810; 345/841; 345/845
(58) Field of Search ................................ 345/785–788, 345/803–808, 818–820, 828–830, 833, 810, 817, 825, 834, 841, 845, 902

(56) References Cited

U.S. PATENT DOCUMENTS

| | | | |
|---|---|---|---|
| 4,951,229 A | | 8/1990 | DiNicola et al. |
| 5,488,483 A | * | 1/1996 | Murayama .................. 382/251 |
| 5,490,245 A | | 2/1996 | Wugofski |
| 5,548,702 A | | 8/1996 | Li et al. |
| 5,615,346 A | * | 3/1997 | Gerken ......................... 345/786 |
| 5,615,347 A | * | 3/1997 | Davis et al. ................. 345/833 |
| 5,655,094 A | * | 8/1997 | Cline et al. .................. 345/786 |
| 5,721,847 A | * | 2/1998 | Johnson ....................... 345/786 |
| 5,844,556 A | | 12/1998 | Takitani et al. |
| 5,959,628 A | * | 9/1999 | Cecchini et al. ............ 345/808 |
| 5,963,724 A | | 10/1999 | Mantooth et al. |
| 6,049,697 A | * | 4/2000 | Scozzarella et al. ....... 340/7.31 |
| 6,069,626 A | * | 5/2000 | Cline et al. .................. 345/786 |
| 6,331,863 B1 | * | 12/2001 | Meier et al. ................. 345/684 |
| 6,384,840 B1 | * | 5/2002 | Frank et al. ................. 345/634 |

OTHER PUBLICATIONS

IBM Technical Disclosure Bulletin, "User Guided Selection or Elimination of Identified Information in Video Sequence", vol. 39, No. 8, Aug. 1996, pp. 141–146.
IBM Technical Disclosure Bulletin, "Overcoming Pop–Up Menu Source Emphasis Deficiencies in the Container Control", vol. 37, No. 10, Oct. 1994, pp. 199–200.

* cited by examiner

*Primary Examiner*—Kristine Kincaid
*Assistant Examiner*—Thomas J Joseph
(74) *Attorney, Agent, or Firm*—Scott W. Reid; Bracewell & Patterson, LLP

(57) ABSTRACT

The present invention provides an improved graphical user interface (GUI) component for presenting mixed mode inputs. A GUI component disclosed as a mixed mode input box according to the present invention permits easier selection within the GUI component of an input among mixed mode inputs such as numeric inputs within a numeric range and combined textual and numeric inputs. Pull-down menu is activated to allow the user to select among mixed mode inputs. When the user selects a numeric value within a numeric range only as the selected input, scroll buttons are activated and used by the user to increment or decrement the numeric value to a desired, selected input value. When the selected input is any other input, such as a combined textual and numeric input, scroll buttons are de-activated. Display of mixed mode input box occupies a relatively small display area and only requires a relatively small amount of code to provide such a layout. Such a small amount of code is able to be stored in a small amount of memory space.

27 Claims, 4 Drawing Sheets

MIXED MODE INPUT FOR A GRAPHICAL USER INTERFACE (GUI) OF A DATA PROCESSING SYSTEM

BACKGROUND OF THE INVENTION

1. Technical Field

The present invention relates in general to data processing systems, and in particular to a graphical user interface (GUI) of a data processing system. Still more particularly, the present invention relates to a mixed-mode GUI input field.

2. Description of the Related Art

Graphical user interface (GUI) components are graphical elements that are displayed on a screen to facilitate interaction between a user and a computer system. Selection menus or selection boxes are among the GUI components that display and allow a user to choose among various predetermined inputs within the selection menus or boxes.

It may be necessary and desired at times to provide a GUI component that permits mixed mode inputs (i.e., numeric inputs, textual inputs, and combined textual and numeric inputs). With reference to FIG. 1, a GUI component 8 that allows mixed mode inputs is displayed on a display screen 14. A radio button 301 is assigned to each combined numeric and textual input 204 (i.e., Item 1, 2, or 3). A radio button 301 is also assigned to spin control box 100 for numeric-only input 104. A user selects an input 204 or spin control box 100 by using a graphical pointing device to select a corresponding radio button 301. If a combined number and text input 204 is selected, then the selection is indicated by highlighting the respective radio button 301, and spin control box 100 is de-activated. If spin control box 100 is selected, then the selection is indicated by highlighting the associated radio button 301. Spin control box 100 has a spin controller with scroll button 106A and scroll button 106B. Scroll buttons 106A and 106B are controlled by the user's interface control device and activated to respectively increment and decrement numeric input 104 (i.e. from the number "10") to a desired number within a numeric range. Desired numeric input 104 is shown within numeric display area 102 in spin control box 100. As shown, GUI component 8 of FIG. 1 that allows selection of mixed mode inputs occupies a relatively large display area. Also, GUI component 8 requires a relatively large amount of code to provide such a layout, and the large amount of code requires a lot of large memory space.

SUMMARY OF THE INVENTION

The present invention provides an improved graphical user interface (GUI) component for presenting mixed mode inputs. A GUI component disclosed as a mixed mode input box according to the present invention permits easier selection within the GUI component of an input among mixed mode inputs such as numeric inputs within a numeric range and combined textual and numeric inputs. Pull-down menu is activated to allow the user to select among mixed mode inputs. When the user selects a numeric value within a numeric range only as the selected input, scroll buttons are activated and used by the user to increment or decrement the numeric value to a desired, selected input value. When the selected input is any other input, such as a combined textual and numeric input, scroll buttons are de-activated. Display of mixed mode input box occupies a relatively small display area and only requires a relatively small amount of code to provide such a layout. Such a small amount of code is able to be stored in a small amount of memory space.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

The present invention provides an improved graphical user interface (GUI) component for presenting mixed mode inputs. A GUI component according to the present invention permits easier selection within the GUI component of an input among mixed mode inputs such as numeric inputs within a numeric range and combined textual and numeric inputs.

Figure 2:
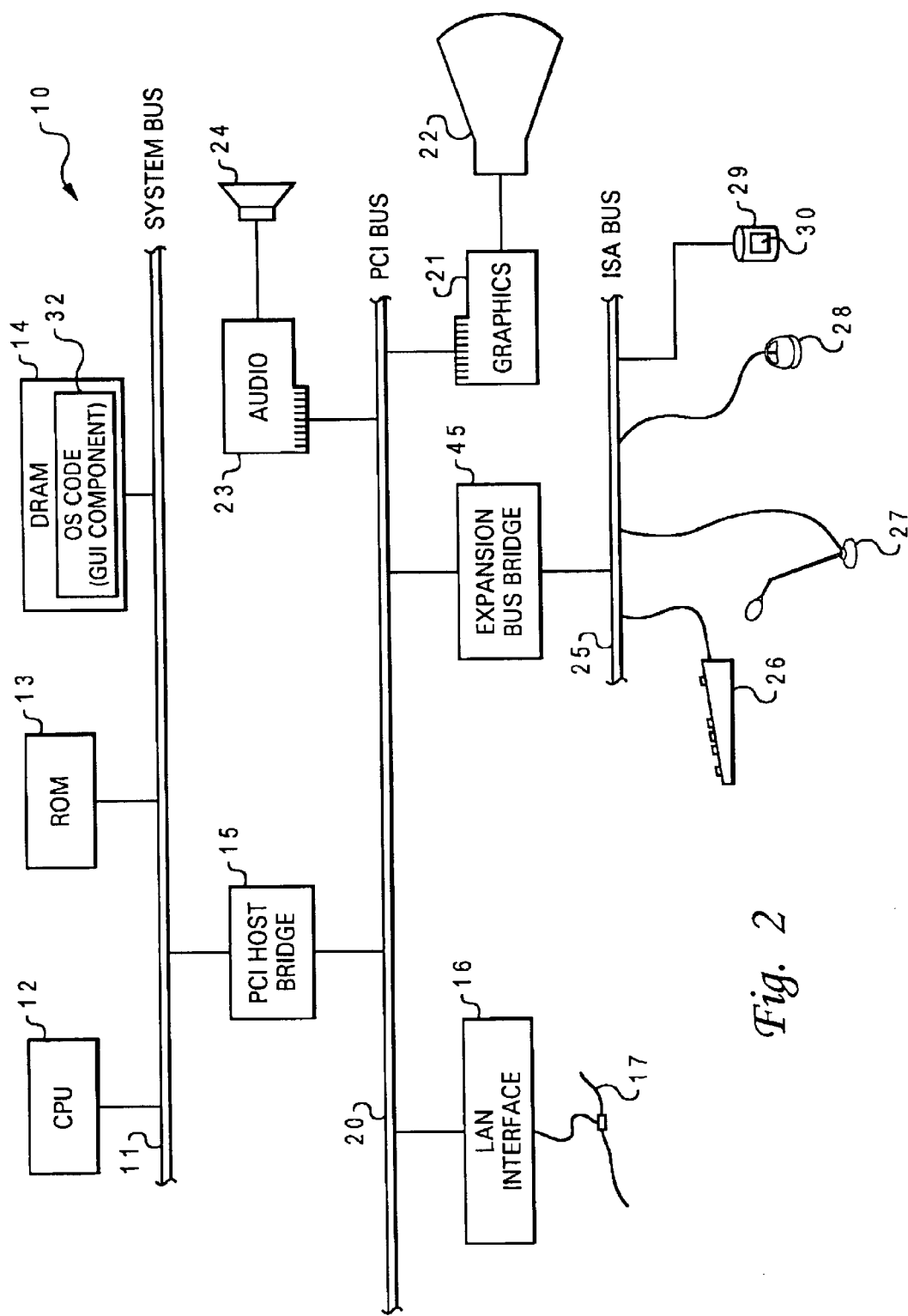
FIG. 2 is a block diagram of an exemplary embodiment of a computer system that may be used to implement the present invention.

Referring to FIG. 2, there is a diagram of a typical computer system 10, which may be used to implement the present invention. As shown, a central processing unit (CPU) 12, read only memory (ROM) 13, and a Dynamic Random Access Memory (DRAM) 14 are connected to a system bus 11 of computer system 10. CPU 12, ROM 13, and DRAM 14 are also coupled to a PCI local bus 20 of computer system 10 through a PCI host bridge 15. PCI host bridge 15 provides a low latency path through which processor 12 may directly access PCI devices mapped anywhere within bus memory and/or I/O address spaces. PCI host bridge 15 also provides a high bandwidth path allowing PCI devices to directly access DRAM 14. In addition, an audio adapter 23 may be attached to PCI local bus 20 for controlling audio output through speaker 24. A graphics adapter 21 may be attached to PCI local bus 20 for controlling visual output through display monitor 22. Also attached to PCI local bus 20 is a local-area-network (LAN) interface adapter 16. LAN interface adapter 16 is for connecting computer system 10 to a local-area network (LAN) 17. A PCI-to-ISA bus bridge, such as an expansion bus bridge 45, may be utilized to couple an ISA bus 25 to PCI local bus 20. As shown, a keyboard 26, a microphone 27, a mouse 28, and a hard disk drive 29 may be attached to ISA bus 25 for performing certain basic I/O functions. Although the illustrated exemplary embodiment describes a PCI local bus 20 and an ISA bus 25, the present invention is not limited to these particular bus architectures. Rather, the present invention can be utilized in any bus system having other different bus architectures.

Figure 1:
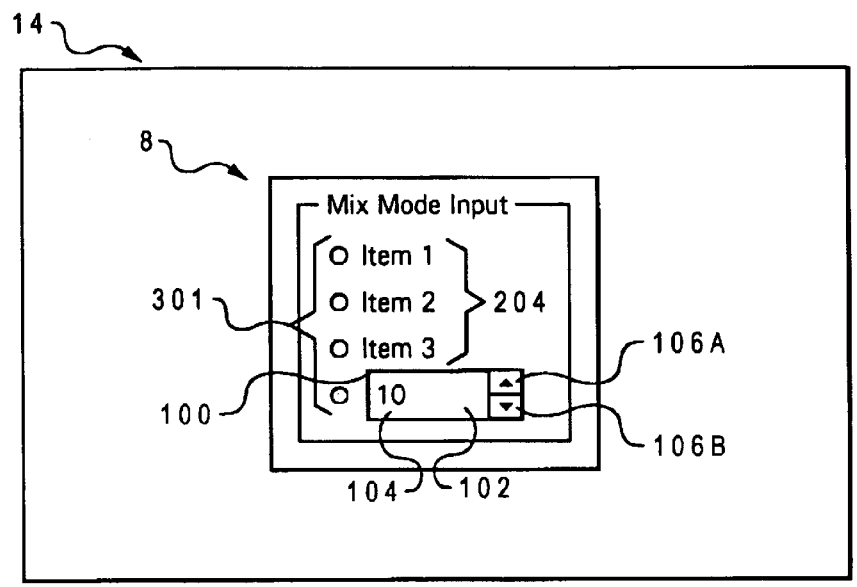
FIG. 1 illustrates a display screen including a prior art mixed mode input box that utilizes radio buttons to select among one of the mixed mode inputs.
Figure 3A:
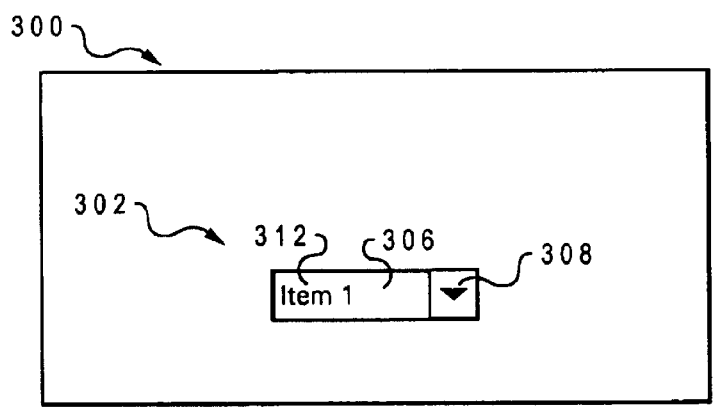
FIG. 3A illustrates a display screen containing a first exemplary embodiment of a mixed mode input box in accordance with the present invention, in which the pull-down menu list and the scroll buttons are not activated and displayed, and in which a combined textual and numeric input is shown to be selected as the input.

Referring to FIGS. 3A to 3E, a display screen 300 showing various views of a first exemplary embodiment of a mixed mode input box 302, which is a mixed mode GUI component, is shown. FIG. 3A illustrates a display screen 300 containing a mixed mode input box 302 in accordance with the present invention. A combined textual and numeric input 312 (i.e., "Item 1") is selected as the input and is shown in selected input display area 306. FIG. 3A shows a pull-down menu activator 308 for activating a pull-down menu 310. As shown in FIG. 3A, since selected input 312 (i.e., "Item 1") is a combined textual and numeric input and not a numeric value within a range, scroll buttons that are used for controlling a value for a numeric value in a numeric range input is not activated and thus not displayed.

Figure 3B:
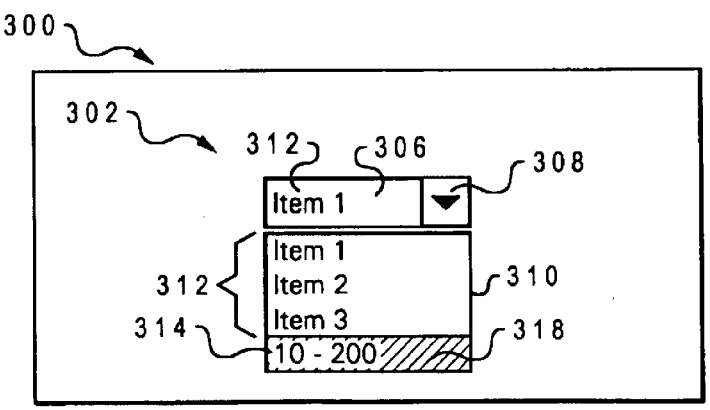
FIG. 3B illustrates a display screen containing the first exemplary embodiment of a mixed mode input box in accordance with the present invention, in which the pull-down menu list is activated and displayed to select a numeric range as the input.

When pull-down menu activator 308 is activated, a pull-down menu list 310 is activated for mixed mode input box 302 and displayed on display screen 300 as shown in FIG. 3B. Pull-down menu list 310 shows various combined textual and numeric inputs 312 and numeric range input 314 among which the user chooses as a selected input. The user is able to select among inputs 312 and 314 by controlling highlighted selection bar 318 through use of an input device, such as mouse 28 or keyboard 26. Selected display area 306 reflects an image as to which input 312 or 314 has been selected by the user. FIG. 3B shows that numeric range input 314 is in the process of being chosen as the selected input since selection bar 318 is highlighting numeric range input 314.

Figure 3C:
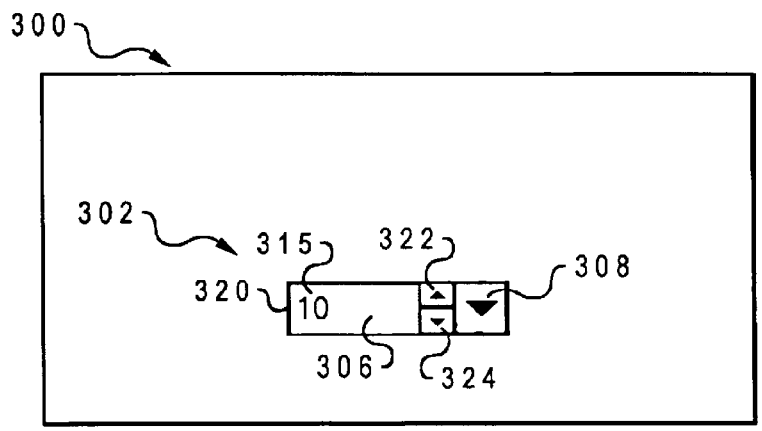
FIG. 3C illustrates a display screen containing the first exemplary embodiment of a mixed mode input box in accordance with the present invention, in which an initial value for the numeric range is displayed in the display area after the numeric range is selected, and in which the scroll controller is activated and displayed to control the value of the numeric value.

After numeric range input 314 has been selected and pull-down menu activator 308 has been de-activated, FIG. 3C shows that pull-down menu list 310 disappears and spin control box 320 is displayed. Spin control box 320 has an initial numeric value input 315 (i.e., the number "10") within numeric range input 314 displayed in selected display area 306. Initial numeric value input 315 is preset to be displayed after numeric range input 314 is chosen as the selected input and pull-down menu list 310 is de-activated. Initial numeric value input 315 does not necessarily have to be the first value within numeric range input 314 and may be a middle numeric value or the last numeric value. FIG. 3C further shows spin control box 320 has a scroll controller. The scroll controller comprises scroll buttons 322 and 324 that are activated and displayed since the input selected is a numeric range input 314 in which initial numeric value input 315 (i.e., number "10") within numeric range input 314 is displayed in selected display area 306. Scroll button 322 is activated for incrementing numeric value input 315 within numeric range input 314 displayed in selected display area 306, and scroll button 324 is activated for decrementing numeric value input 315 within numeric range input 314 displayed in selected display area 306. A user uses an input device, such as mouse 28 or keyboard 26, to activate scroll button 322 or 324 to respectively increment or decrement numeric value input 315 to a desired numeric value.

Figure 3D:
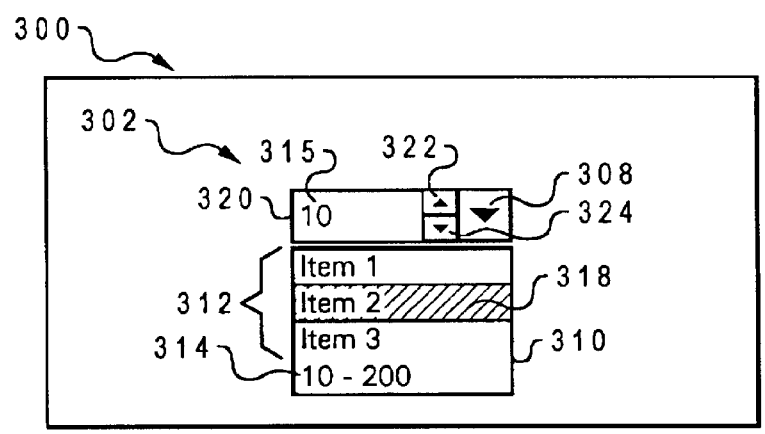
FIG. 3D illustrates a display screen containing the first exemplary embodiment of a mixed mode input box in accordance with the present invention, in which the pull-down menu list is activated and displayed to select another input among the inputs in the pull-down menu.
Figure 3E:
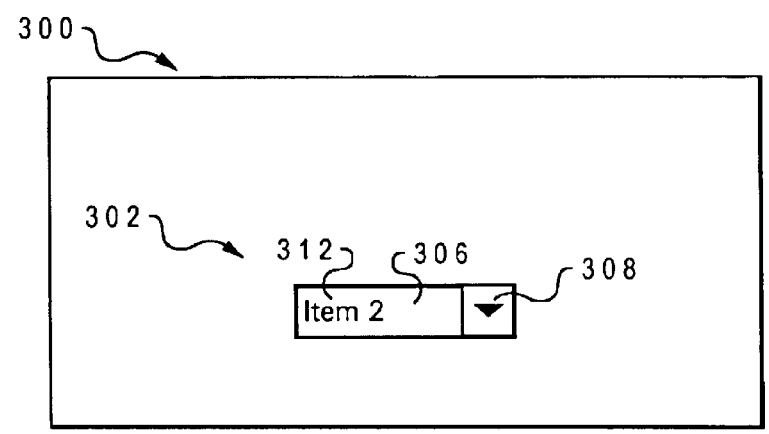
FIG. 3E illustrates a display screen containing the first exemplary embodiment of a mixed mode input box in accordance with the present invention, in which the other input has been selected among the inputs in the pull-down menu.

If pull-down menu activator 308 is again activated, pull-down menu list 310 is again displayed, as shown in FIG. 3D. Another input 312 (i.e. "Item 2") is shown being selected since selection bar 318 has been moved, through use of an input device, to highlight "Item 2". FIG. 3E shows mixed mode input box 302 after "Item 2" has been selected and pull-down menu activator 308 is de-activated. Pull-down menu list 310 disappears, and "Item 2" is displayed in selected display area 306. FIG. 3E depicts that scroll buttons 322 and 324 are de-activated and no longer displayed since the selected input that is also displayed in selected display area 306 is a combined textual and numeric 312 (i.e., "Item 2") and not a numeric value input 315 within a numeric range input 314.

FIGS. 3A to 3E disclose an exemplary embodiment of the present invention in which scroll buttons 322 and 324 are activated when scroll buttons 322 and 324 are displayed on screen 300 and are de-activated when scroll buttons 322 and 324 are made to disappear from screen 300. The present invention is not in any way limited to any specific way of activating and de-activating scroll buttons 322 and 324, and many other ways of activating and de-activating scroll buttons 322 and 324 exist. For example, another way of activating and de-activating scroll buttons 322 and 324 would be to maintain one appearance of scroll buttons 322 and 324 (i.e., shade scroll buttons 322 and 324 with one color) to indicate to the user that they are activated and to change the display of scroll buttons 322 and 324 to another appearance (i.e., shade scroll buttons 322 and 324 with another color) to indicate to the user that they are de-activated.

Mixed mode input box 302 is implemented in program code. The program code is generally stored as part of the operating system code for computer system 10. Referring back to FIG. 2, program code 30 for mixed mode input box 302 is stored in hard disk drive 29 and is executed as operating system code 32 out of DRAM 14 by CPU 12.

Figure 4:
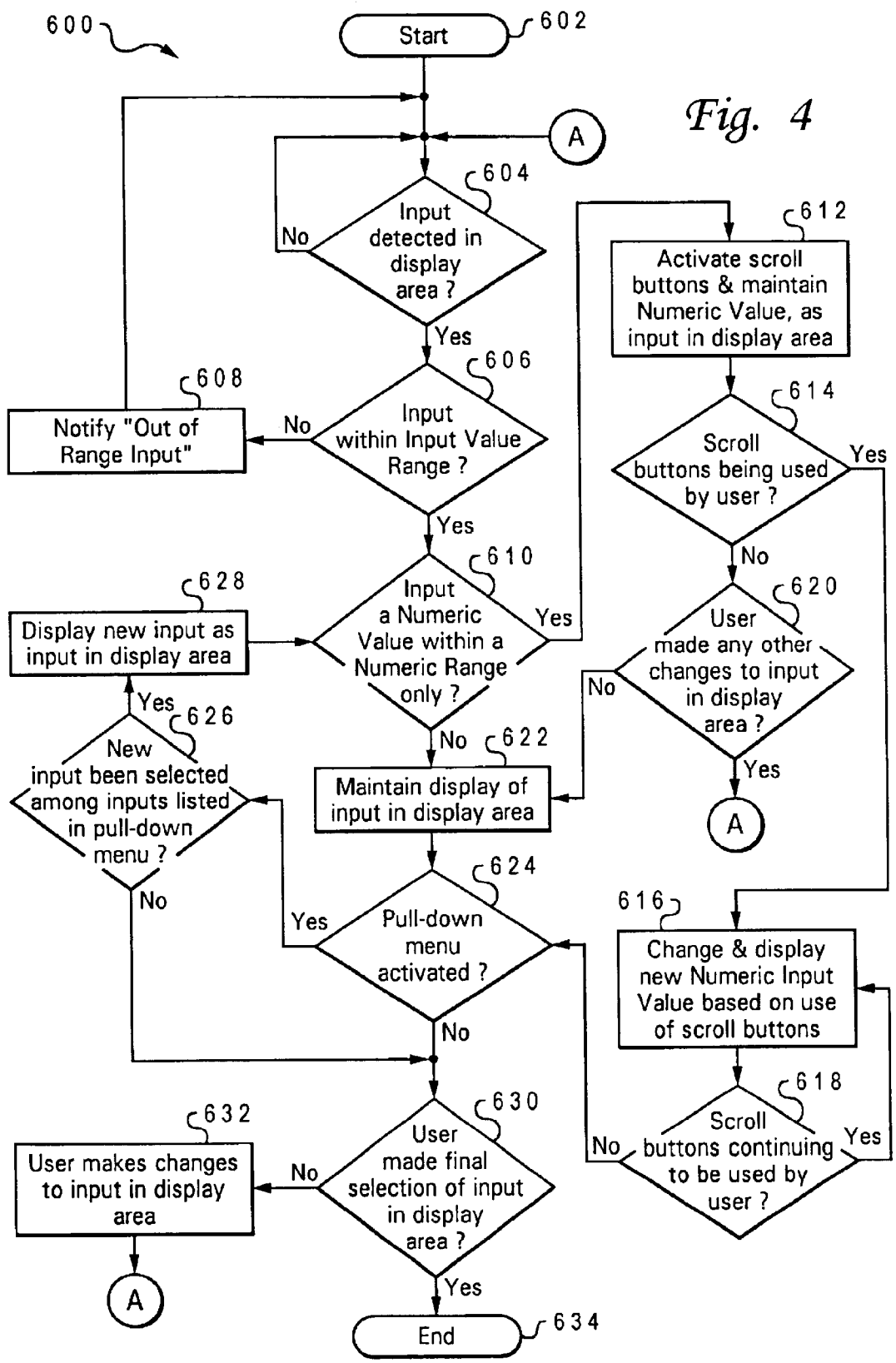
FIG. 4 is a flow chart of an exemplary method for implementing the present invention.

With reference now to FIG. 4, a flow chart of an exemplary method 600 of operating a GUI in accordance with the present invention is illustrated. Method 600 starts at block 602 and moves to decision block 604. At decision block 604, method 600 iterates until the user selects an input in selected display area 306. If a selected input is detected at decision block 604, then method 600 moves to decision block 606. At decision block 606, a determination is made as to whether the input is within a range of input values. The input value range for mixed mode input box 302 includes all of the allowable inputs that are selectable for mixed mode GUI component. If the selected input is not within the input value range at decision block 606, then method 600 moves to block 608. At block 608, a notification of an "out-of-range" input is provided to the user. Method 600 then returns to block 604. On the other hand, if the selected input is within the input value range at decision block 606, then method 600 moves to decision block 610. At decision block 610, a determination is made as to whether the selected input displayed in selected display area 306 is a numeric value input 315 within a numeric range input 314. If the selected input is a numeric value input 315 within a numeric range input 314 at decision block 610, then method 600 proceeds to blocks 612 to 620. On the other hand, if the selected input is not a numeric value input 315 within a numeric range input 314 at decision block 610, then method 600 moves to blocks 622 to 630.

Referring now to block 612, scroll buttons 322 and 324 are activated at block 612. Scroll buttons 322 and 324 can be activated in any manner, such as the way shown in FIGS. 3A to 3E (i.e., scroll buttons 322 and 324 appear to activate and disappear to de-activate) or any other suitable manner. At block 612, the display of numeric value input 315 is maintained as the input in selected display area 306. From block 612, method 600 moves to decision block 614, which illustrates a determination whether scroll buttons 322 and 324 are being used by the user (through use of an input device). If scroll buttons 322 and 324 are being used by the user, then at block 616, the selected input is changed to a new numeric value input 315 within numeric range 314 is displayed in selected display area 306. Method 600 then moves to decision block 618, which depicts a determination whether scroll buttons 322 and 324 are continuing to be used by the user. If scroll buttons 322 and 324 are continuing to be used by the user then method 600 loops back to block 616, and the selected input continues to be changed and respectively displayed until the user stops using scroll buttons 322 and 324 to change numeric value input 315. However, if scroll buttons 322 and 324 are no longer being used by the user, then the desired numeric value 315 is shown as the selected input in selected display area 306, and method 600 moves onto decision block 624, which will be later discussed in more detail. However, if at decision block 614, scroll buttons 322 and 324 are not being used by the user, then method 600 moves to decision block 620. At decision block 620, a determination is made as to whether the user has made any other changes to the input in selected display area 306. If any other change has been made to the input at decision block 620, then method 600 returns to block 604 via connector A. On the other hand, if no other changes have been made to the input at decision block 620, then method 600 moves to block 622 in which display of the input in display area 306 is maintained.

Referring now to decision block 624, a determination is made as to whether a pull-down menu 310 is activated. If pull-down menu 310 is activated at decision block 624, then method 600 moves to decision block 626. At decision block 626, a determination is made as to whether a new input has been selected among inputs listed in pull-down menu 310. If such a new input has been selected, then method 600 moves to block 628, which shows the new input being displayed as the input in selected display area 306. Method 600 then returns to decision block 610 and continues therefrom. On the other hand, if a new input has not been selected at decision block 626, then method 600 moves to decision block 630. Also, however, if a pull-down menu 310 has not been activated at decision block 624, then method 600 moves to decision block 630.

At decision block 630, a determination is made as to whether the user has made the final selection of an input in selected display area 306. For example, this determination may be accomplished by having the user click an "OK" button within mixed mode input box 302 to confirm the selection of the input. If a final selection of the input has not been made at decision block 630, then method 600 moves to block 632. At block 632, the user makes desired changes to the input in selected display area 306 via an input selection method as discussed earlier, and method 600 returns to block 604 via connector A. However, if a final selection of the input has been made at block 630, then method 600 ends at block 634.

Thus, a mixed mode input box 302 allows a user to select among mixed mode inputs, such as numeric inputs and combined textual and numeric inputs. Pull-down menu 310 is activated to allow the user to select among mixed mode inputs. When the user selects a numeric value within a numeric range only as the selected input, scroll buttons 322 and 324 are activated and used by the user to increment or decrement the numeric value to a desired, selected input value. When the selected input is any other input, such as a combined textual and numeric input, scroll buttons 322 and 324 are de-activated. Display of mixed mode input box 302 occupies a relatively small display area and only requires a relatively small amount of code to provide such a layout. Such a small amount of code is able to be stored in a small amount of memory space.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of supporting mixed mode input within a graphical user interface (GUI) component, said method comprising:

displaying within the GUI component an input field, wherein said input field is a fillable text box in which any of a plurality of valid values may be entered, wherein said plurality of valid values includes a plurality of ordered values having a predefined order with respect to each other and at least one non-ordered value;

permitting entry of a value within said input field utilizing a first input modality;

in response to entry within said input field of a selected value among said plurality of valid values:

displaying within said input field only said selected value out of all of said plurality of valid values; and if the selected value is a first ordered value among said plurality of ordered values, activating a graphical control displayed in association with the input field to permit user adjustment of the first ordered value to a second ordered value among the plurality of ordered values; and if the selected value is a non-ordered value, de-activating the graphical control.

2. The method according to claim 1, further comprising:

determining whether value entered in said input field is outside a permitted range of said plurality of ordered values; and if the entered value is outside the permitted range, presenting an out-of-range indication.

3. The method according to claim 1, wherein said selected value is the first ordered value among said plurality of ordered values, said method further comprising:

in response to manipulation of said graphical control utilizing an input device, changing the value displayed within said input field from said first ordered value to the second ordered value among the plurality of ordered values.

4. The method according to claim 1, wherein permitting entry of a value utilizing a first input modality comprises:

permitting entry of a value by keying in said value.

5. The method according to claim 1, wherein permitting entry of a value utilizing a first input modality comprises:

associating a pull-down menu control element with said input field;

in response to interaction with said pull-down menu control element, presenting a pull-down menu including at least one entry for ordered values and at least one entry for non-ordered values; and determining said selected value in response to user selection of one of said entries in said pull-down menu.

6. The method according to claim 1, wherein said graphical control comprises a scroll controller, and wherein the activating step further comprises:

displaying the scroll controller in response to entry of an ordered value as said selected value.

7. The method according to claim 1, wherein the de-activating step further comprises removing from display the graphical control.

8. The method according to claim 1, wherein:

the activating step further comprises displaying said graphical control with one appearance; and the de-activating step further comprises displaying the graphical control with a different appearance.

9. The method of claim 1, wherein:

said plurality of ordered values comprises a plurality of numeric values; and said at least one non-ordered values comprises at least string.

10. A system for supporting mixed mode inputs within a graphical user interface (GUI) component, said system comprising:

a processor, a display, an input device, and a memory system, wherein said display, said input device and said memory system are all coupled to said at least a processor; and a program code within said memory system and executable by said processor to cause the display, within said display, of a GUI component including an input field, wherein said input field is a fillable text box in which any of a plurality of valid values may be entered, said plurality of valid values including a plurality of ordered values having a predefined order with respect to each other and at least one non-ordered value, wherein the program code, responsive to entry within the input field of a selected value among said plurality of valid values utilizing said first input modality, displays said selected value within said input field and, if said selected value is a first ordered value among said plurality of ordered values, activates a graphical control displayed in association with the input field to permit user adjustment of the first ordered value to a second ordered value among the plurality of ordered values, and if the selected value is a non-ordered value, de-activates the graphical control.

11. The system according to claim 10, wherein the program code determines whether a value entered in said input field is outside an input value range and, if so, presents an out-of-range indication.

12. The system according to claim 10, wherein said selected value is the first ordered value among said plurality of ordered values, and wherein, said program code, responsive to manipulation of said graphical control utilizing the input device, changes the value displayed within said input field from said first ordered value to the second ordered value among the plurality of ordered values.

13. The system according to claim 10, wherein the input device comprises keys, and wherein said program code receives entry of a value utilizing a first input modality by receiving one or more keyed inputs.

14. The system according to claim 10, wherein the program code displays in association with said input field a pull-down menu control element, and, responsive to interaction with said pull-down menu control element, presents a pull-down menu including at least one entry for ordered values and at least one entry for non-ordered values, and, responsive to user selection of one of said entries in said pull-down menu, receives said selected value as an input.

15. The system according to claim 10, wherein said graphical control comprises a scroll controller, and wherein the program code displays the scroll controller in response to entry of an ordered value as said selected value.

16. The system according to claim 10, wherein the program code deactivates said graphical control by removing said graphical control from display.

17. The system according to claim 10, wherein the program code displays said graphical control with one appearance in activating the graphical control and displays the graphical control with another appearance in de-activating the graphical control.

18. The system of claim 9, wherein:

said plurality of ordered values comprises a plurality of numeric values; and said at least one non-ordered values comprises at least one string.

19. A program product for supporting mixed mode input within a graphical user interface (GUI) component, said program product comprising:

program code executable by a data processing system to cause the data processing system to display, within a display, a GUI component including an input field, wherein said input field is a fillable text box in which a plurality of valid values may be entered, said plurality of valid values including a plurality of ordered values having a predefined order with respect to each other and at least one non-ordered value, wherein the program code, responsive to entry within the input field of a selected value among said plurality of valid values utilizing said first input modality, displays said selected value within said input field and, if said selected value is a first ordered value among said plurality of ordered values, activates a graphical control displayed in association with the input field to permit user adjustment of the first ordered value to a second ordered value among the plurality of ordered values, and if the selected value is a non-ordered value, de-activates the graphical control; and computer usable media bearing said program code.

20. The program product according to claim 19, wherein the program code determines whether a value entered in said input field is outside an input value range and, if so, presents an out-of-range indication.

21. The program product according to claim 19, further comprises:

wherein said selected value is a first ordered value among said plurality of ordered values, and wherein said program code, responsive to manipulation of said graphical control utilizing an input device, changes the value displayed within said input field from said first ordered value to the second ordered value among the plurality of ordered values.

22. The program product according to claim 19, wherein the data processing system has a keyed input device, and wherein said program code receives entry of a value utilizing a first input modality by receiving one or more keyed inputs.

23. The program product according to claim 19, wherein the program code displays in association with said input field a pull-down menu control element, and, responsive to interaction with said pull-down menu control element, presents a pull-down menu including at least one entry for ordered values and at least one entry for non-ordered values, and, responsive to user selection of one of said entries in said pull-down menu, receives said selected value as an input.

24. The program product according to claim 19, wherein the graphical control comprises a scroll controller, and wherein the program code displays the scroll controller in response to entry of an ordered value as said selected value.

25. The program product according to claim 19, wherein:

the program code deactivates said graphical control by removing said graphical control from display.

26. The program product according to claim 19, wherein:

the program code displays said graphical control with one appearance in activating the graphical control and displays the graphical control with another appearance in de-activating the graphical control.

27. The program product of claim 19, wherein:

said plurality of ordered values comprises a plurality of numeric values; and said at least one non-ordered values comprises at least one string.

* * * * *